United States Patent
Di Gianni et al.

(10) Patent No.: US 10,332,659 B2
(45) Date of Patent: Jun. 25, 2019

(54) METHOD OF PRODUCING HIGH VOLTAGE ELECTRICAL INSULATION

(75) Inventors: Anna Di Gianni, Gebenstorf (CH); Lars E. Schmidt, Oskarshamn (SE); Patrick Meier, Staufen (CH); Marco Sangermano, Turin (IT)

(73) Assignee: ABB Research Ltd., Zurich (CH)

( * ) Notice: Subject to any disclaimer, the term of this patent is extended or adjusted under 35 U.S.C. 154(b) by 600 days.

(21) Appl. No.: 14/343,632

(22) PCT Filed: Sep. 9, 2011

(86) PCT No.: PCT/EP2011/065617
§ 371 (c)(1),
(2), (4) Date: Jun. 25, 2014

(87) PCT Pub. No.: WO2013/034193
PCT Pub. Date: Mar. 14, 2013

(65) Prior Publication Data
US 2014/0329023 A1    Nov. 6, 2014

(51) Int. Cl.
| | | |
|---|---|---|
| H01B 19/02 | (2006.01) | |
| C08G 59/68 | (2006.01) | |
| H01B 3/40 | (2006.01) | |
| C08J 3/24 | (2006.01) | |
| C08J 5/24 | (2006.01) | |
| B29C 70/06 | (2006.01) | |
| B29C 35/02 | (2006.01) | |
| B29C 35/08 | (2006.01) | |
| C08L 63/00 | (2006.01) | |
| C08G 59/02 | (2006.01) | |
| C08K 7/14 | (2006.01) | |
| H01B 19/04 | (2006.01) | |

(52) U.S. Cl.
CPC ............ H01B 19/02 (2013.01); B29C 35/02 (2013.01); B29C 35/0805 (2013.01); B29C 70/06 (2013.01); C08G 59/022 (2013.01); C08G 59/68 (2013.01); C08J 3/243 (2013.01); C08J 5/24 (2013.01); C08K 7/14 (2013.01); C08L 63/00 (2013.01); H01B 3/40 (2013.01); H01B 19/04 (2013.01); *B29C 2035/0827* (2013.01); *B29K 2995/0007* (2013.01); *C08J 2363/00* (2013.01)

(58) Field of Classification Search
None
See application file for complete search history.

(56) References Cited

U.S. PATENT DOCUMENTS

| | | |
|---|---|---|
| 6,200,408 B1 | 3/2001 | Bayer et al. |
| 6,439,698 B1 | 8/2002 | Patil |
| 7,795,744 B2 | 9/2010 | Chen et al. |
| 2004/0251385 A1* | 12/2004 | Lindberg ............... H02G 7/20 248/49 |
| 2007/0208106 A1 | 9/2007 | Chen et al. |

FOREIGN PATENT DOCUMENTS

| | | | |
|---|---|---|---|
| CN | 101092504 A | 12/2007 | |
| CN | 101103062 A | 1/2008 | |
| DE | 19705027 A1 | 8/1998 | |
| EP | 1840149 A1 | 10/2007 | |
| EP | 2 487 193 A1 | 8/2012 | |
| WO | 2007017307 A1 | 2/2007 | |
| WO | WO 2007109295 A3 * | 10/2008 | ....... B29D 11/00355 |
| WO | 2011/043288 A1 | 4/2011 | |
| WO | 2015/022004 A1 | 2/2015 | |

OTHER PUBLICATIONS

Machine translation of WO 2007/017307.*
Definition of High Voltage from Wikipedia accessed at https://en.wikipedia.org/w/index.php?title=High_voltage&oldid=778663416 on May 17, 2017.*
Garcia et al. "Cationic Crosslinking of Solid DGEBA Resins with Ytterbium (III) Trifluoromethanesulfonate as Initiator" Journal of Thermal Analysis and Calorimetry, vol. 83 (2006) 2, 429-438.*
Chinese Office Action for Chinese Patent Application No. 201180073346.9 dated Apr. 15, 2016.
Chinese Office Action for Chinese Patent Application No. 201180073346.9 dated Jul. 23, 2015.
Stapp B et al: "Photo- and Thermoinitiated Curing of Epoxy Resins by Sulfonium Salts", Angewandte Makromolekulare Chemie, Applied Macromolecularchemistry and Physics, Wiley VCH, Weinheim, DE, vol. 209, Jul. 1, 1993 (Jul. 1, 1993), pp. 197-212, XP000382864, ISSN: 0003-3146, DOI: 10.1002/APMC.1993.052090118.
Chinese office action for application No. 2016110901102570 dated Nov. 4, 2016.

* cited by examiner

*Primary Examiner* — Robert S Walters, Jr.
(74) *Attorney, Agent, or Firm* — Bachman & LaPointe, PC

(57) ABSTRACT

Method of producing a high voltage electrical insulation, in that (i) an ultra-violet radiation as well as thermally curable composition, comprising at least one UV-curable and heat-curable epoxy resin, at least one cationic photo-initiator and at least one cationic thermal-initiator, is provided, and that (ii) ultraviolet radiation as well as heat is applied to the curable composition in any desired sequence for a time long enough until complete curing of the curable composition is obtained and products obtained.

17 Claims, No Drawings

METHOD OF PRODUCING HIGH VOLTAGE ELECTRICAL INSULATION

FIELD OF INVENTION

The present invention refers to a method of producing a high voltage electrical insulation from an ultra-violet radiation (UV) and thermally curable composition, said composition comprising at least one UV-curable and thermally curable epoxy resin, at least one cationic photo-initiator and at least one cationic thermal-initiator. The present invention further refers to said ultra-violet radiation (UV) and thermally curable composition.

Preferably the present invention refers to a method of producing a fiber reinforced high voltage electrical insulation in the form of a fiber-reinforced composite, being made from an ultra-violet radiation (UV) and thermally curable composition comprising at least one UV-curable and heat-curable epoxy resin, at least one cationic photo-initiator, at least one cationic thermal-initiator, and a fiber reinforcing material, such as continuous mineral or organic fibers as single fibers or in the form of filaments or woven filaments or as chopped fibers or a combination thereof, the method of producing said fiber reinforced high voltage electrical insulation preferably being carried out by using a wet filament winding process.

STATE OF THE ART

Thermally curable epoxy resin compositions for producing high voltage electrical insulations generally are based on a two-component system comprising an epoxy resin component and a hardening component. These compositions are cured at high temperatures for several hours requiring long curing and cooling times and a long occupation of the mould. Moreover many thermal hardening components, such as anhydrides, can cause emissions and connected therewith health and environmental problems. In some production processes, like wet filament winding, the use of such thermally curable compositions has additional disadvantages, like material losses due to dripping, which can amount to of up to 10%, the need of continuous rotation of the mandrel inside the curing oven, and the difficulty to create multilayered structures when changing the impregnation resin or the reinforcing fiber while winding.

It has now been found that thermally curable epoxy resin compositions for producing high voltage electrical insulations can be based on cationically curable epoxy resins, without the use of a hardening component, i.e. representing a one-component epoxy resin system, said system being UV-curable and heat-curable. By replacing the heat-curable two-component epoxy resin system by a UV-curable and heat-curable one-component epoxy resin system, it is possible to overcome the above mentioned limitations, combined with the advantages of having short curing times which are within the ranges of minutes, reduced energy consumption and practically no emissions that could cause health and environmental problems.

When using cationically curable epoxy resins, it was found that it is difficult to cure homogenously a thick or a highly filled resin system, since the penetration depth of the UV-light throughout the material is limited. Hence, it was not possible to produce sufficiently cured parts with a thickness of several millimeters to centimeters (cm) by UV-irradiation, so that these parts could be used as electrical high voltage insulators. The present invention allows producing relatively thick layers without being limited to coating applications and, further, to use conventional aliphatic and/or aromatic epoxy resins, in spite of the fact that aromatic resins absorb UV-light.

It was surprisingly found that when using cationically curable epoxy resins which are UV-curable and heat-curable, high voltage insulators of excellent quality are obtained on curing said curable epoxy resins by applying UV-curing as well as heat-curing. This method allows short solidification times of liquid resin, no dripping and waste of material in production processes, no or only low harmful emissions, and short mould occupation times as well as simplification of production processes, such as no need to rotate the mandrel in the oven during curing.

WO 2007/017307 discloses a UV-curable and thermosetting epoxy resin formulation for the production of lacquers for electronic subassemblies in humid spaces. Said resin formulation contains diluents, such as alcohols and polyols. Experiments have shown that these formulations are not suitable for the use as high voltage insulators. U.S. Pat. No. 7,795,744 B2 discloses special UV-curable and thermosetting epoxy resin formulations yielding cured products with excellent sealing and adhesive properties to glass, being useful as adhesive when at least one of two materials to be attached is a glass. These formulations, too, are unsuitable for the production of high voltage insulators.

DETAILED DESCRIPTION OF THE INVENTION

The present invention is defined in the claims. Specifically, the present invention refers to a method of producing a high voltage electrical insulation, characterized in that (i) an ultra-violet radiation as well as thermally curable composition, comprising at least one UV-curable and heat-curable epoxy resin, at least one cationic photo-initiator and at least one cationic thermal-initiator, is provided, and that (ii) ultra-violet radiation as well as heat is applied to said curable composition in any desired sequence for a time long enough until complete curing of said curable composition is obtained.

The present invention further refers to the use of an ultra-violet radiation and thermally curable composition, comprising at least one UV-curable and heat-curable epoxy resin, at least one cationic photo-initiator and at least one cationic thermal-initiator, for the production of high voltage electrical insulations. Said use includes treating said ultra-violet radiation and thermally curable composition with ultra-violet radiation as well as with heat in any desired sequence for a time long enough until complete curing of said curable composition is obtained.

The present invention further refers to a method of producing a high voltage electrical insulation in the form of a fiber reinforced high voltage electrical insulation as a fiber-reinforced composite, characterized in that (i) an ultra-violet radiation and thermally curable composition, comprising at least one UV-curable and heat-curable epoxy resin, at least one cationic photo-initiator, at least one cationic thermal-initiator, and further a fiber reinforcing material, preferably continuous mineral or organic fibers as single fibers or in the form of filaments or woven filaments or as chopped fibers or a combination thereof, is provided, and that (ii) ultra-violet radiation as well as heat is applied to said curable composition in any desired sequence for a time long enough until complete curing of said curable composition is obtained. Preferably the method is carried out by using a wet filament winding process wherein the filaments are pre-impregnated with the ultra-violet radiation and thermally curable composition and subsequently are treated with ultra-violet radiation and heat in any desired sequence.

The present invention further refers to said ultra-violet radiation and thermally curable composition, comprising at least one UV-curable and heat-curable epoxy resin, at least one cationic photo-initiator, at least one cationic thermal-initiator, and optionally a fiber reinforcing material, preferably continuous mineral or organic fibers as single fibers or in the form of filaments or woven filaments or as chopped fibers or a combination thereof, being useful for the production of high voltage electrical insulations.

The present invention also refers to compositions as described herein above, containing as a cationic photo-initiator a diaryliodonium salt or a triarylsulphonium salt and as a cationic thermal-initiator ytterbium trifluoromethane sulphonate hydrate.

The present invention further refers to the curable epoxy resin composition as defined herein above in its cured state said cured composition being present in the form of an electrical insulation system, and preferably in the form of an electrical insulator made according to the present invention.

The present invention further refers to electrical articles comprising an electrical insulator system made according to the present invention.

The method of producing a high voltage electrical insulation in the form of a fiber reinforced high voltage electrical insulation according to the present invention preferably is used in the production of high voltage surge arresters. Using a UV-curable and heat-curable epoxy resin formulation according to the present invention allows distinctly reducing curing and cooling times as well as eliminating the use of high curing temperatures.

According to the present invention, the curable composition comprises at least one UV-curable and heat-curable epoxy resin. Such UV-curable and heat-curable epoxy resins are preferably aromatic and/or cycloaliphatic compounds. These compounds are known per se. Suitable epoxy resins are reactive glycidyl compounds containing at least two 1,2-epoxy groups per molecule. Epoxy compounds useful for the present invention comprise unsubstituted glycidyl groups and/or glycidyl groups substituted with methyl groups. These glycidyl compounds preferably have a molecular weight between 200 and 1200, especially between 200 and 1000. The epoxy value (equiv./100 g) is preferably at least three, preferably at least four and especially at about five, preferably about 4.9 to 5.1. Preferred are glycidyl compounds which have glycidyl ether- and/or glycidyl ester groups. Such a compound may also contain both kinds of glycidyl groups, e.g. 4-glycidyloxy-benzoic acid-glycidyl ester. Preferred are polyglycidyl esters with 1-4 glycidyl ester groups, especially diglycidyl ester and/or triglycidyl esters. Preferred glycidyl esters may be derived from aromatic, araliphatic, cycloaliphatic, heterocyclic, dicarbonic acids or from aliphatic dicarbonic acids with 2 to 10 carbon atoms. Preferred are for example optionally substituted epoxy resins of formula (III):

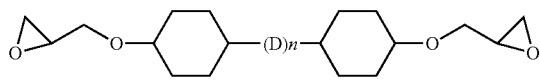

(III)

D=—O—, —SO2-, —CO—, —CH2-, —C(CH3)2-, —C(CF3)2-
n=zero or 1
or optionally substituted epoxy resins of formula (IV):

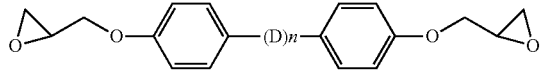

(IV)

D=—O—, —SO2-, —CO—, —CH2-, —C(CH3)2-, —C(CF3)2-
n=zero or 1
or formula (V):

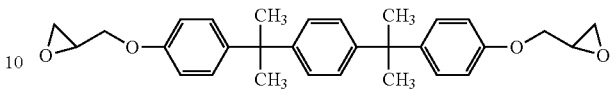

(V)

Preferred are glycidyl ethers derived from Bisphenol A or Bisphenol F as well as glycidyl ethers derived from Phenol-Novolak-resins or Cresol-Novolak-resins. Compounds of formula (III) or formula (IV) wherein D is —(CH$_2$)— or [—C(CH$_3$)$_2$—] are preferred, such as diglycidylether of 2,2-bis-(4-hydroxyphenyl)-propane [diglycidylether of bisphenol A (DGEBA)].

DGEBA is commercially available having an epoxy value (equiv./kg) of at least three, preferably at least four and especially at about five or higher, preferably about 5.0 to 6.1. Analogous cycloaliphatic epoxy resin compounds are also commercially available for example Araldite® CY 184 (Huntsman Advanced Materials Ltd.), a cycloaliphatic diglycidylester epoxy resin compound having an epoxy content of 5.80-6.10 (equiv/kg) or Araldite® CY 5622 (Huntsman Advanced Materials Ltd.).

Further examples of epoxy resins to be used according to the present invention are hexahydro-o-phthalic acid-bis-glycidyl-ester, hexahydro-m-phthalic acid-bis-glycidyl ester or hexahydro-p-phthalic acid-bis-glycidyl ester. Also aliphatic epoxy resins, for example 1,4-butane-diol diglycidyl ether, may be used as a component for the composition of the present invention.

Preferred epoxy resin compounds are liquid at room temperature or when heated to a temperature of up to about 65° C. The concentration of the epoxy resin component in the total composition preferably is within the range of 45% by weight to 99% by weight, preferably within the range of 60% by weight to 80% by weight, calculated to the final cured composite body.

The curable composition further contains at least one cationic photo-initiator. Cationic photo-initiator compounds are known in the art. Preferred are known sulphonium cations and/or iodonium cations combined with known anions such as $BF_4^-$, $PF_6^-$, $AsF_6^-$, and $SbF_6^-$. Preferred sulphonium cations are triarylsulphonium cations $[(C_6H_5)_3S^+]$, which may be substituted at one or more of the aryl-substituents. Preferred iodonium cations are diaryliodonium cations $[(C_6H_5)_2I^+]$, which may be substituted at one or more of the phenyl rings. These cations are combined with one of the said anions. The preferred anion is hexafluoroantimonate ($SbF_6^-$). Preferred is the triarylsulphonium-hexafluoroantimonate.

These cationic photo-initiator produces cationic active species on irradiation with UV-light and are present within the composition preferably within the range of 0.1% by weight to 5.0% by weight, preferably within the range of 0.2% by weight to 3.0% by weight, and preferably at about 1% by weight, each time calculated to the weight of the epoxy resin component present.

The curable composition further contains at least one cationic thermal-initiator. Cationic thermal-initiator compounds are known in the art. Preferred examples are salts with ytterbium cations like ytterbiumtrifluoromethane sulfonate hydrate [$Yb(F_3CSO_3)_3 \cdot xH_2O$] or metal salts of triflic acid ($F_3CSO_3H$) or ammonium salts with hexafluoroanions, preferably with $BF_4^-$, $PF_6^-$, $AsF_6^-$, or $SbF_6^-$, such as $NH_4^+$ SbF$_6^-$, or salts containing sulphonium cations of the formula [(R$_1$)(R$_2$)(R$_3$)S$^+$] wherein at least one, and preferably two, of the three substituents represent an alkyl radical or two of the substituents form an aliphatic ring together with the S-atom; said cation being combined with known anions such as BF$_4^-$, PF$_6^-$, AsF$_6^-$, and SbF$_6^-$.

Preferred sulphonium cations of formula [(R$_1$)(R$_2$)(R$_3$)S$^+$] being effective as thermal-initiator are those wherein R$_1$ and R$_2$ independent of each other are (C$_{1-6}$)alkyl, benzyl, allyl, or R$_1$ and R$_2$ together with the S-atom form a cyclic five-membered saturated ring, i.e. both ends of the —(CH$_2$)— residue are bound to the S-atom. R$_3$ preferably is phenyl or naphthyl.

Preferred examples for cationic thermal-initiator compounds are metal salts of triflic acid. Most preferred is ytterbium trifluoromethane sulfonate hydrate.

These cationic thermal-initiator compounds form cationic active species on heating which promote cross-linking and curing of the epoxy resin component at temperatures of about 80° C. to 130° C., preferably at about 120° C. when heated to these temperatures for about one hour.

The cationic thermal-initiator compound is present within the composition preferably within the range of 0.01% by weight to 3.0% by weight, preferably within the range of 0.05% by weight to 2.0% by weight, and preferably at about 1% by weight, each time calculated to the weight of the epoxy resin component present.

When the epoxy resin composition as described herein is irradiated with UV-light, the photo-initiator is activated and the photo-curing of the epoxy resin is initiated leading at least to the gelation of the system. Then, if necessary, a heat-curing of about one hour at 120° C., by activating the thermal-initiator, allows complete curing of the manufactured part.

Preferred is a composition as described herein before, containing as a cationic photo-initiator a diaryliodonium or a triarylsulphonium salt, preferably as a salt with SbF$_6^-$, and as a cationic thermal-initiator ytterbium trifluoromethane sulphonate hydrate. Such a formulation is particularly useful when curing thick or highly filled systems, which are known for being difficult to cure by UV-irradiation.

Curing is effected by applying UV-radiation as well as heat to the curable composition in any desired sequence. Preferably first UV-radiation is applied and subsequently heating the composition to a temperature within the range of 60° C. to 130° C., preferably to about 80° C. to 120° C. It is, for example, also possible to apply UV-radiation and at the same time heating the composition within the temperature range of 60° C. to 130° C. for a period of about one hour.

For curing with UV-irradiation, preferably UVA and/or UVB-light, within the range of about 200 nm to about 800 nm and with irradiation energy of about 1200 mJ/cm$^2$ is used. As a UV-source commercially available lamps can be used, such as Aetek Model QC 1202/N UV processor containing two 200 Watt/inch medium pressure mercury vapor lamps or a fusion system irradiator containing one 300 Watt/inch-bulb.

UV-irradiation may be combined with infra-red (IR) irradiation. In this respect, mercury vapor lamps are suitable to combine UV-irradiation with IR-irradiation in parallel, as mercury vapor lamps partially irradiate also in the IR range. However, the application of a separate IR-source is useful with reference to the effect of improved cure by heating.

In a further embodiment of the invention the method of producing a high voltage electrical insulation is carried out by incorporating to the curable composition a fiber reinforcing material, preferably continuous mineral or organic fibers as single fibers or in the form of filaments or woven filaments, such as rovings, or as chopped fibers or a combination thereof. Such mineral fibers as applied for high voltage electrical insulators are glass fibers and ceramic fibers and known per se. Examples of such fibers are aluminum oxide, basalt, and glass fibers. Examples of organic fibers are aramide fibers or polyester fibers. Preferred are glass fibers. Diameter and strength of such fibers as used in electrical insulations are known.

Preferably the method is carried out by using a wet filament winding process wherein the filaments are pre-impregnated with the ultra-violet radiation and thermally curable composition followed by winding the impregnated fibers on a mandrel. Such processes are known in the art.

The curable composition is made by mixing all the components, optionally under vacuum, in any desired sequence. Preferably the at least one cationic photo-initiator and the at least one cationic thermal-initiator are stored separately and are added to the UV-curable and heat-curable epoxy resin shortly before curing. Whilst the UV-irradiation can be carried out at room temperature the heat curing is carried at temperature ranges as described herein above.

Depending on the type of electrical insulator to be produced, the curable composition may further contain optional additives selected from filler materials, wetting/dispersing agents, plasticizers, antioxidants, light absorbers, as well as further additives used in electrical applications.

Examples of filler materials are known inorganic filler such as silica and aluminum trihydrate (ATH), glass powder, chopped glass fibers, metal oxides such as silicon oxide (e.g. Aerosil, quartz, fine quartz powder), metal nitrides, metal carbides, natural and synthetic silicates, as known to the expert in the art. Also the average particle size distribution of such fillers and the quantity present within the composition as applied in electrical high voltage insulators are known in the art. Preferred filler materials are silica and aluminum trihydrate (ATH).

The filler material may be combined or may be pretreated with a coupling agent for improving the bonding between the polymer matrix and the filler. Such a coupling agent is preferably selected from the group comprising silanes, siloxanes, titanate compounds, zirconate compounds, aluminate compounds, functionalized copolymers and organic acid-chromium chloride coordination complexes. Preferred are silanes and siloxanes. Most preferred are silanes. Such coupling agents have been described in the art. A preferred coupling agent is for example 3-glycidoxypropyltrimethoxysilane, as is commercially available under the trade name Dow Z-6040. The coupling agents are preferably used in amounts of 0.5% to 1.0% based on the filler weight.

Plasticizers, antioxidants, light absorbers, as well as further additives used in electrical applications are known in the art and are not critical.

Electrical insulation produced according to the present invention can be used for insulating electrical coils and in the production of electrical components such as transformers, bushings, insulators, switches, sensors, converters, cable end seals and high voltage surge arresters.

Preferred uses of the insulation system produced according to the present invention are also high-voltage insulations for indoor and outdoor use, especially for outdoor insulators associated with high-voltage lines, as long-rod, composite and cap-type insulators, and also for base insulators in the medium-voltage sector, in the production of insulators associated with outdoor power switches, measuring transducers, lead-throughs, and overvoltage protectors, in switchgear construction, in power switches, dry-type transformers, and electrical machines, as coating materials for transistors and other semiconductor elements and/or to impregnate electrical components. The following example illustrates the invention.

Example 1

The following components were mixed together (parts by weight):
- 98 parts of epoxy resin: CY225 (Huntsmann AG) (Bisphenol A-diglycidylether)
- 1 part of cationic photo-initiator: Irgacure (Ciba AG), [(Aryl)$_2$I$^+$] (SbF$_6$—)
- 1 part of cationic thermal-initiator: ytterbium trifluoromethane sulfonate hydrate (Aldrich AG).

The components were mixed with a mechanical stirrer until a liquid homogenous mixture was obtained. This mixture was then put under vacuum and then poured into the impregnation bath of a winding machine (Super Hornet filament winding machine from McClean Anderson). A woven roving of continuous glass fibers (from AGY Ltd.) was drawn through the impregnation bath so as to impregnate the glass fibers with the curable epoxy resin composition, followed by winding the impregnated fibers onto a rotating mandrel, whereby the curable insulator composition was given the form of the electrical insulator. This composition was then cured by the application of UV-irradiation and heat.

The UV-irradiation was carried out at room temperature with an Aetek Model QC 1202/N UV-processor, containing two 200 Watt/inch medium pressure mercury vapor lamp whilst the winding operation took place. The obtained product was then heated to a temperature of 110° C. for a period of 3 hours. The cured product obtained had a Tg of about 130° C. The mechanical properties were comparable to the mechanical properties of the standard epoxy composites in use.

The invention claimed is:

1. A method for producing electrical insulation for electrical coils, transformers, bushings, long-rods, composite and cap-type insulators, switches, sensors, converters, and cable end seals, the method comprising the steps of:
   (i) providing an ultra-violet radiation as well as thermally curable composition, comprising at least one of each of (a) to (c):
      (a) one UV-curable and heat-curable epoxy resin;
      (b) one cationic photo-initiator;
      (c) one cationic thermal-initiator;
   (ii) applying ultra-violet radiation as well as heat to said curable composition in any desired sequence for a time long enough until complete curing of said curable composition is obtained as a cured composition; and
   (iii) including the cured composition obtained in (ii) as a material in the production of electrical insulation systems for electrical coils, transformers, bushings, long-rods, composite and cap-type insulators, switches, sensors, converters, and cable end seals, wherein the cationic photo-initiator is a cationic photo-initiator compound which is composed of a sulphonium cation and/or iodonium cation combined with an anion selected from the group consisting of BF$_4^-$, PF$_6^-$, and AsF$_6^-$, and
   wherein the cationic thermal-initiator comprises at least one of the following:
      (1) a salt with an ytterbium cation, and
      (2) a metal salt of triflic acid.

2. The method of claim 1, wherein the UV-curable and heat-curable epoxy resin represents an aromatic and/or cycloaliphatic reactive glycidyl compound containing at least two 1,2-epoxy groups per molecule.

3. The method of claim 2, wherein the UV-curable and heat-curable epoxy resin represents an aromatic and/or cycloaliphatic reactive glycidyl compound containing at least two 1,2-epoxy groups per molecule and having a molecular weight between 200 and 1200, and an epoxy value (equiv./100 g) of at least three.

4. The method of claim 3, wherein the UV-curable and heat-curable epoxy resin is liquid at room temperature or when heated to a temperature of up to about 65° C.

5. The method of claim 2, wherein the UV-curable and heat-curable epoxy resin represents an aromatic and/or cycloaliphatic reactive glycidyl compound containing at least two 1,2-epoxy groups per molecule and having a molecular weight between 200 and 1000, and having an epoxy value (equiv./100 g) of at least four.

6. The method of claim 2, wherein the UV-curable and heat-curable epoxy resin represents an aromatic and/or cycloaliphatic reactive glycidyl compound containing at least two 1,2-epoxy groups per molecule and having a molecular weight between 200 and 1000, and having an epoxy value (equiv./100 g) of about 4.9 to 5.1.

7. The method of claim 1, wherein the sulphonium cation is a triarylsulphonium cation, optionally substituted at one or more of the aryl substituents, and the iodonium cation is a diaryliodonium cation, optionally substituted at one or more of the aryl rings.

8. The method of claim 1, wherein the cationic photo-initiator is present within the curable composition within the range of 0.2% by weight to 3.0% by weight calculated to the weight of the epoxy resin present.

9. The method of claim 1, wherein the cationic thermal-initiator compound is present within the curable composition within the range of 0.05% by weight to 2.0% by weight calculated to the weight of the epoxy resin present.

10. The method of claim 1, wherein
    heat is applied to said curable composition at temperatures of about 80° C. to 130° C.

11. The method of claim 1, wherein
    first UV-irradiation is applied and subsequently the curable composition is heated to a temperature within the range of 80° C. to 120° C.

12. The method of claim 1, wherein
    the UV-irradiation is carried out with UVA and/or UVB-light and with irradiation energy of about 1200 mJ/cm$^2$.

13. The method of claim 1, further comprising incorporating into the curable composition a fiber reinforcing material.

14. The method of claim 13, further comprising incorporating to the curable composition continuous mineral or organic fibers, as single fibers or in the form of filaments or woven filaments, or as chopped fibers or a combination thereof;
    wherein the mineral fibers are selected from the group consisting of glass fibers, ceramic fibers, aluminum oxide fibers, basalt fibers, and glass fibers; and
    the organic fibers are selected from aramid fibers and polyester fibers.

15. The method of claim 14, wherein the method is carried out by using a wet filament winding process wherein filaments are pre-impregnated with the ultra-violet radiation and thermally curable composition followed by winding the impregnated filaments on a mandrel.

16. The method of claim 1, wherein the curable composition further contains optional additives selected from filler materials, wetting/dispersing agents, plasticizers, antioxidants, and light absorbers.

17. A method of producing electrical insulation for electrical coils, transformers, bushings, long-rods, composite and cap-type insulators, switches, sensors, converters, and cable end seals as a fiber-reinforced composite, the method comprising the steps of:
  (i) providing an ultra-violet radiation and thermally curable composition, comprising at least one UV-curable and heat-curable epoxy resin, at least one cationic photo-initiator, at least one cationic thermal-initiator, and further a fiber reinforcing material; and
  (ii) applying ultra-violet radiation as well as heat to said curable composition in a sequence and time to obtain complete curing of said curable composition,
    wherein the cationic photo-initiator is a cationic photo-initiator compound which is composed of a sulphonium cation and/or iodonium cation combined with an anion selected from the group consisting of $BF_4^-$, $PF_6^-$, and $AsF_6^-$, and
    wherein the cationic thermal-initiator comprises at least one of the following:
    (1) a salt with an ytterbium cation, and
    (2) a metal salt of triflic acid.

* * * * *